Feb. 24, 1942.  F. R. STANLEY  2,274,251
DETACHABLE COUPLING FOR LUBRICATING APPARATUS
Filed June 4, 1941

INVENTOR
F.R. STANLEY.
By
ATTORNEYS

Patented Feb. 24, 1942

2,274,251

UNITED STATES PATENT OFFICE 2,274,251

DETACHABLE COUPLING FOR LUBRICATING APPARATUS

Frederic Reginald Stanley, London, England

Application June 4, 1941, Serial No. 396,618
In Great Britain January 2, 1941

2 Claims. (Cl. 285—170)

This invention relates to detachable couplings for lubricating apparatus of the kind adapted to engage a receiving nipple of the known type having a spherical head.

The object of the present invention is to provide a coupling of simple construction which can be readily applied to or detached from the nipple so as to form a lubricant-tight connection between the nipple and the tube through which the lubricant is supplied under pressure.

According to this invention a coupling for lubricating apparatus comprises a tubular body portion having an outlet at one end, a plurality of nipple-engaging jaws surrounding the body and projecting beyond the outlet, and a sleeve enclosing the jaws and movable axially upon the body to maintain the jaws in their closed position on the nipple and to cause them to clamp the outlet end of the body against the nipple. A resilient gasket is preferably seated in the end of the body member to surround the outlet and a spring-controlled valve, opened by the pressure of the lubricant, is located between the outlet and the inlet, through which the lubricant is introduced.

Figure 1:
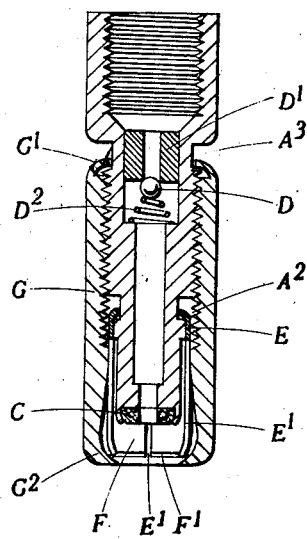
Figure 2:
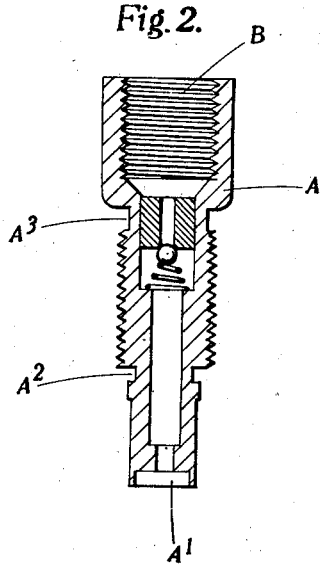

A preferred construction according to the present invention is illustrated by way of example in the accompanying drawing, in which Figure 1 shows the connector in vertical section, and Figure 2 is a similar view of the body member detached.

The connector comprises a tubular body member A having an enlarged internal screw-threaded head B to receive the tube (not shown) through which lubricant is supplied under pressure. The lower end of the body is provided with a recess $A^1$ surrounding the outlet opening and this recess is adapted to seat a resilient gasket C which is retained in position by pressing over the end of the body, as shown in Figure 1.

Formed below the enlarged head B is a chamber containing a ball valve D normally pressed against its seat $D^1$ by means of a spring $D^2$ and this valve only opens when exposed to the pressure of the lubricant in the supply tube and thus prevents leakage when the apparatus is not in use.

Surrounding the lower end of the body is a tube or collet E provided with a number of longitudinal slits $E^1$ to form resilient jaws F, the lower ends $F^1$ of which are inturned as shown in Figure 1 and extend beyond the resilient gasket C. The upper end of the sleeve E is inturned to engage a circumferential groove or recess $A^2$ formed in the body, and the tube E with its jaws F can move in an axial direction relatively to the body.

Mounted upon the body is an internally screw-threaded sleeve G the upper end $G^1$ of which is turned over to engage a recess $A^3$. The lower end of the sleeve is tapered or provided with an inclined internal shoulder $G^2$ adapted to engage the ends of the jaws when the sleeve G is moved relatively to them and to prevent them from spreading.

When the connector is to be applied to a nipple, the sleeve occupies its lower position, shown in Figure 1, so that the shoulder $G^2$ is just clear of the ends of the jaws F and so enables these jaws to expand and snap over a spherical nipple when the conductor is pressed into engagement therewith. The sleeve G is then rotated and is caused to move away from the nipple whereupon the shoulder $G^2$, by engaging the inturned jaws $F^1$, first prevents these jaws from spreading and then, as rotation of the sleeve continues, moves the sleeve $E^1$ and all the jaws axially towards the head of the body, and in this way clamps the resilient gasket C firmly against the nipple so as to make a fluid-tight connection therewith.

Lubricant is then permitted to pass through the supply tube into the nipple until the latter is charged when a slight reverse rotation of the sleeve G enables the connector to be removed from the nipple.

What I claim as my invention and desire to secure by Letters Patent is:

1. A coupling for lubricating apparatus comprising only three main parts, i. e., a tubular portion having an outlet at one end, a tubular collet movable axially upon the body and having a plurality of integral resilient jaws, said jaws surrounding the body and extending beyond the outlet, and an internally screw-threaded sleeve enclosing the jaws and movable axially therewith upon the body when rotated relatively to the latter so as to draw and clamp the outlet end of the body against the lubricant-receiving nipple and to prevent the jaws from spreading.

2. A coupling as set forth in claim 1, in which the tubular portion is provided with a recess to receive the inturned end of the collet thereby to prevent accidental removal and to provide a limited axial movement.

FREDERIC REGINALD STANLEY.